United States Patent [19]
Cheong

[11] Patent Number: 5,969,909
[45] Date of Patent: Oct. 19, 1999

[54] PRINT MOTOR ASSEMBLY FOR USE IN A MAGNETIC RECORDING/REPRODUCING APPARATUS

[75] Inventor: Man-Sheel Cheong, Seoul, Rep. of Korea

[73] Assignee: Daewoo Electronics Co., Ltd., Rep. of Korea

[21] Appl. No.: 09/088,074

[22] Filed: Jun. 1, 1998

[30] Foreign Application Priority Data

Apr. 30, 1998 [KR] Rep. of Korea ........................ 98-6970
Apr. 30, 1998 [KR] Rep. of Korea ........................ 98-6971

[51] Int. Cl.⁶ .................................................... G11B 5/52
[52] U.S. Cl. ...................................... 360/107; 360/130.24
[58] Field of Search ............................. 360/107, 130.24, 360/84–85, 108

[56] References Cited

U.S. PATENT DOCUMENTS

| | | | |
|---|---|---|---|
| 4,347,536 | 8/1982 | Miyashita et al. | 360/107 |
| 4,536,672 | 8/1985 | Kanayama et al. | 310/268 |
| 5,675,206 | 10/1997 | Horski . | |
| 5,739,985 | 4/1998 | Kim | 360/107 |

FOREIGN PATENT DOCUMENTS

| | | |
|---|---|---|
| 1-030018 | 1/1989 | Japan . |
| 2-179913 | 7/1990 | Japan . |
| 3-230312 | 10/1991 | Japan . |
| 9-073601 | 3/1997 | Japan . |
| 1184921 | 3/1970 | United Kingdom . |

*Primary Examiner*—William J. Klimowicz
*Attorney, Agent, or Firm*—Pennie & Edmonds LLP

[57] ABSTRACT

A head drum assembly for use in a magnetic recording/reproducing apparatus includes a rotary shaft, a head drum secured to the rotary shaft via a bearing, a bushing fitted around the rotary shaft, for preloading the bearing, the bushing having a top and a bottom surfaces, and a print motor assembly. The print motor assembly includes an upper rotor yoke mounted on the top surface of the bushing, a printed circuit board stator winding attached on the head drum so as to be located below the upper rotor yoke, a lower rotor yoke attached on the bottom surface of the bushing so as to be positioned below the printed circuit board stator winding, and a permanent magnet disposed at an inside of the lower rotor yoke facing toward the printed circuit board stator winding.

4 Claims, 3 Drawing Sheets

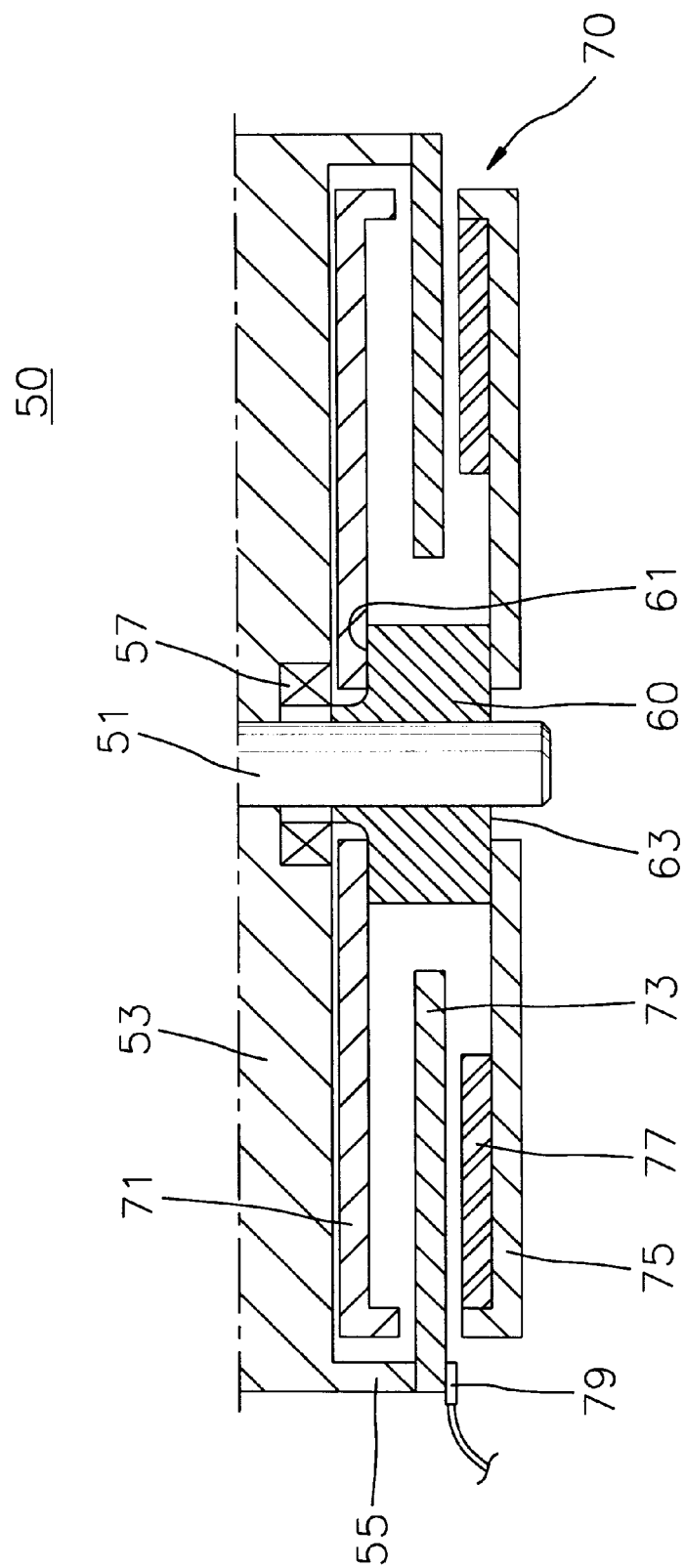

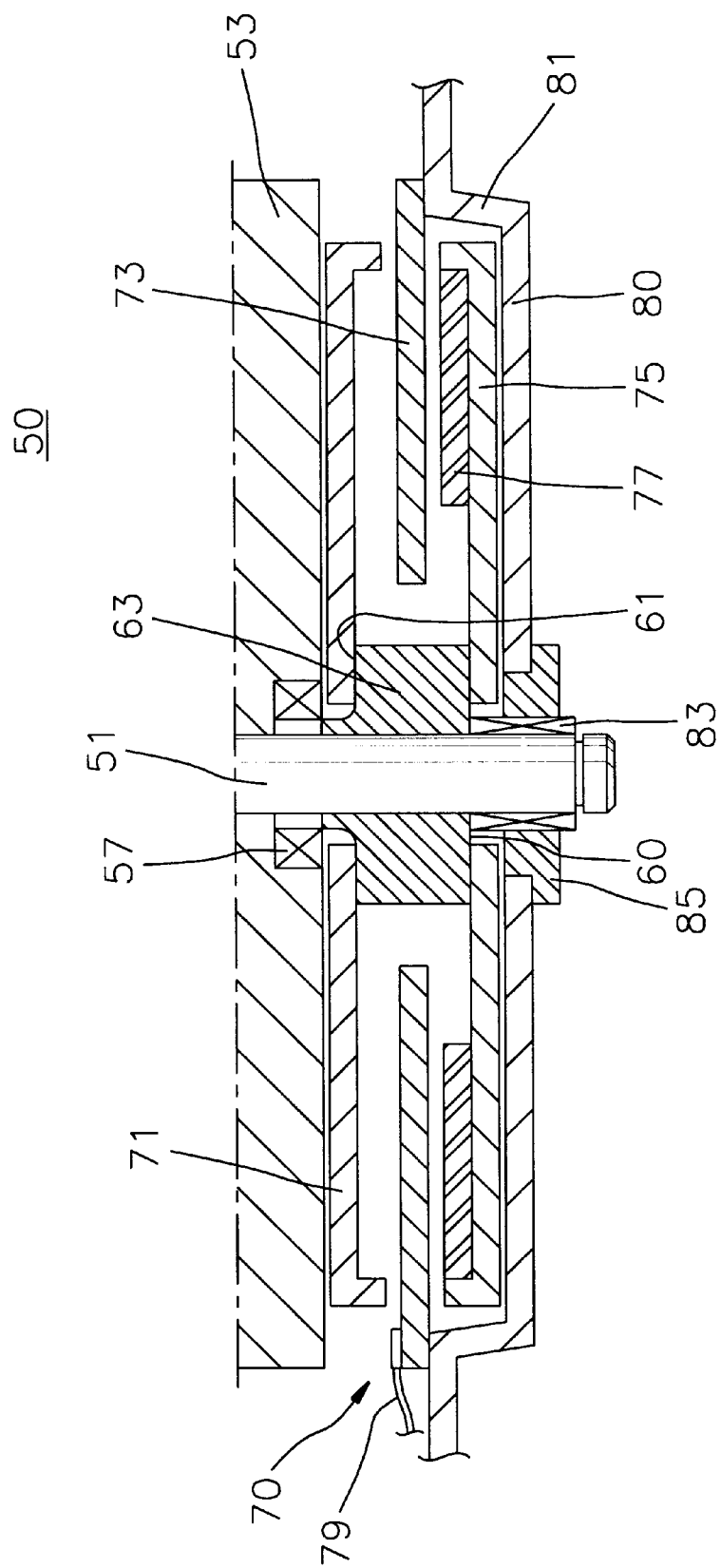

PRINT MOTOR ASSEMBLY FOR USE IN A MAGNETIC RECORDING/REPRODUCING APPARATUS

FIELD OF THE INVENTION

The present invention relates to a magnetic recording/reproducing apparatus; and, more particularly, to a print motor assembly for use therein.

BACKGROUND OF THE INVENTION

In general, a magnetic recording/reproducing apparatus having a rotary type head drum such as a digital video camcorder is provided with a motor assembly. The head drum is supported by a shaft. The motor assembly is disposed at the upper part or the lower part of the shaft and is used to rotate the head drum. Recently, a print motor assembly is used as the motor assembly with a view to reduce the overall size and weight of the apparatus.

One of head drum assemblies employing the prior art print motor assembly is shown in FIG. 1. As shown, the head drum assembly 10 includes a fixed shaft 12, a head drum 14 rotatably supported by the fixed shaft 12 through a bearing 16 and, a print motor assembly 20.

The print motor assembly 20 includes a lower rotor yoke 22, a permanent magnet 24, a printed circuit board stator winding 26 (hereinafter, PCB stator winding 26), and an upper rotor yoke 28. The PCB stator winding 26 as used herein refers to a circuit board including a dielectric board with lead wires disposed on one or more sides of the dielectric board.

The lower rotor yoke 22 is seated on an inside of the head drum 14 and the permanent magnet 24 is mounted on the lower rotor yoke 22.

The permanent magnet 24 has a plurality of magnetic pole pairs arranged at equal angular spacings, wherein each pair of the magnetic pole pairs is equally magnetized so that the north and the south poles thereof are of equal strength.

The PCB stator winding 26 is secured to the fixed shaft 12 using a flange 30. To be more specific, after the PCB stator winding 26 is mounted on a stepped portion 32 of the flange 30, the flange 30 is tightly fitted around the fixed shaft 12. Thereafter, the flange 30 and the PCB stator winding 26 are joined with each other by soldering. Further, the PCB stator winding 26 is electrically connected with a flexible connector 34 for transmitting a motor driving signal through a soldered portion 36.

The upper rotor yoke 28 is seated on a shoulder 18 of the head drum 14 using an adhesive bonding or the like.

When the motor driving signal is transmitted onto the PCB stator winding 26 through the flexible connector 34, the PCB stator winding 26 rotates the head drum 14 in conjunction with the permanent magnet 24.

However, there are a number of problems associated with the above described print motor assembly. First all, the above mentioned arrangement of the print motor assembly is not adapted to a rotary shaft. Further, it is easy for the connector for transmission of the motor driving signal to come into a contact with the upper rotor yoke.

SUMMARY OF THE INVENTION

It is, therefore, a primary object of the invention to provide a print motor assembly adaptive to a head drum employing a rotary shaft.

In accordance with one aspect of the present invention, there is provided a head drum assembly for use in a magnetic recording/reproducing apparatus, the head drum assembly comprising: a rotary shaft, a head drum secured to the rotary shaft via a bearing, a bushing fitted around the rotary shaft, for preloading the bearing, the bushing having a top and a bottom surfaces, and a print motor assembly including an upper rotor yoke, a printed circuit board stator winding, a lower rotor yoke, and a permanent magnet, wherein the upper rotor yoke is mounted on the top surface of the bushing, the printed circuit board stator winding is attached on the head drum so as to be located below the upper rotor, the lower rotor yoke is attached on the bottom surface of the bushing so as to be positioned below the printed circuit board stator winding, and the permanent magnet is disposed at an inside of the lower rotor yoke facing toward the printed circuit board stator winding.

BRIEF DESCRIPTION OF THE DRAWINGS

The above and other objects and features of the instant invention will become apparent from the following description of preferred embodiments taken in conjunction with the accompanying drawings, in which:

FIG. 2 presents a partial cross sectional view of a head drum employing a print motor assembly in accordance with the first embodiment of the present invention; and FIG. 3 illustrates a partial cross sectional view of a head drum employing a print motor assembly in accordance with the second embodiment of the present invention.

DETAILED DESCRIPTION OF THE PREFERRED EMBODIMENTS

Figure 1:
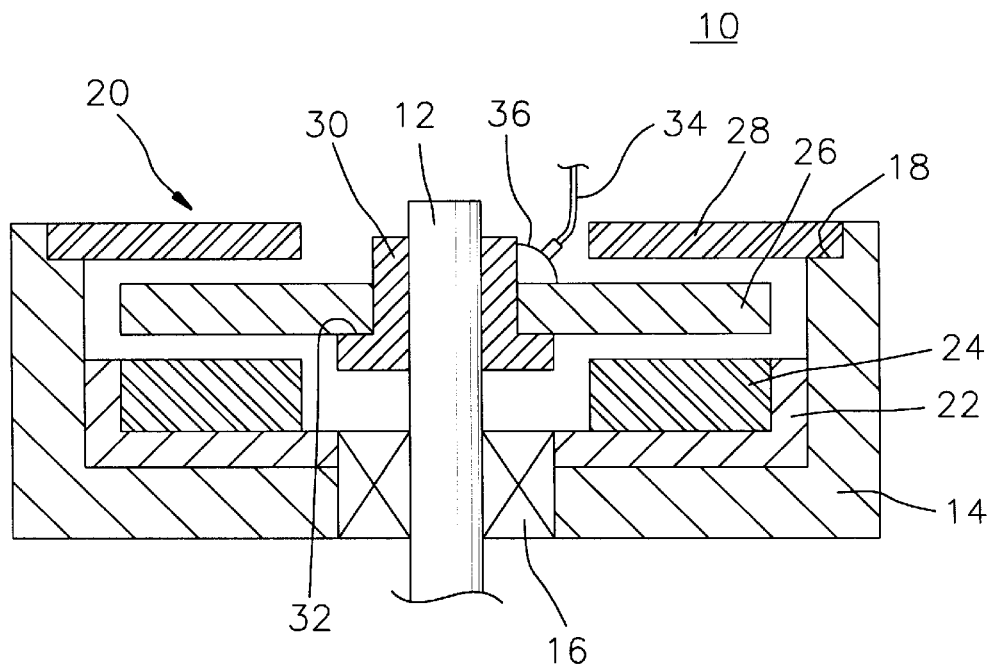
FIG. 1 shows a partial cross sectional view of a head drum employing the conventional print motor assembly.

Referring to FIG. 2, an inventive head drum assembly 50 includes a rotary shaft 51, a head drum 53 secured to the rotary shaft 51 through a bearing 57, a bushing 60 for preloading the bearing 57, and a print motor assembly 70. The bushing 60 having a top and a bottom surfaces 61, 63 is tightly fitted around the rotary shaft 51 so as to preload the bearing 57.

The print motor assembly 70 includes an upper rotor yoke 71, a printed circuit board stator winding 73 (hereinafter, PCB stator winding 73), a lower rotor yoke 75, and a permanent magnet 77. The PCB stator winding 73 as used herein refers to a circuit board including a dielectric board with lead wires disposed on one or more sides of the dielectric board.

The upper rotor yoke 71 is mounted on the top surface 61 of the bushing 60, the PCB stator winding 73 is attached on a protruding portion 55 downwardly extending from a rim of the head drum 53 so as to be located below the upper rotor yoke 71, and the lower rotor yoke 75 is attached on the bottom surface 63 of the bushing 60 so that it is positioned below the PCB stator winding 73. The PCB stator winding 73 is electrically connected with a flexible connector 79 for transmitting a motor driving signal.

The permanent magnet 77 is disposed at an inside of the lower rotor yoke 75 facing toward the PCB stator winding 73. The permanent magnet 77 has a plurality of magnetic pole pairs arranged at equal angular spacings, wherein each pair of the magnetic pole pairs is equally magnetized so that the north and the south poles thereof are of equal strength. Although not shown, another permanent magnet may be provided on a bottom surface of the upper rotor yoke 71 facing toward the PCB stator winding 73.

When the motor driving signal is transmitted onto the PCB stator winding 73 through the connector 79, the PCB stator winding 73 rotates the head drum 53 in conjunction with the permanent magnet 77.

Although the above discussions were presented referring to a situation where the PCB stator winding 73 is attached on the head drum 53, as shown in FIG. 3, the PCB stator winding 73 may be supported by a deck 80 on which the head drum assembly 50 is mounted. In this case, the rotary shaft 51 is rotatably engaged with the deck 80 using another bearing 83 fitted around the rotary shaft 51 and another bushing 85, and the deck 80 is provided with a bending portion 81 for supporting the PCB stator winding 73. Further, although not shown, another permanent magnet may be provided on a bottom surface of the upper rotor yoke 71 facing toward the PCB stator winding 73.

The arrangement of the print motor assembly in according with the present invention is adaptive to a rotary type shaft. Further, since the upper and the lower rotor yokes are, respectively, disposed at the top and the bottom surfaces of the bushing, the axial gap therebetween is adjustable by simply increasing or decreasing the thickness of the bushing. In addition, it is easy for the connector for transmitting the motor driving signal to be connected to the PCB stator winding.

Although the invention has been shown and described with respect to the preferred embodiments, it will be understood by those skilled in the art that various changes and modifications may be made without departing from the scope of the invention as defined in the following claims.

What is claimed is:

1. A head drum assembly for use in a magnetic recording/reproducing apparatus, comprising:

a rotary shaft;

a head drum secured to the rotary shaft via a bearing;

a bushing fitted around the rotary shaft, for preloading the bearing, the bushing having a top and a bottom surfaces; and a print motor assembly including an upper rotor yoke, a printed circuit board stator winding, a lower rotor yoke, and a permanent magnet, wherein the upper rotor yoke is mounted on the top surface of the bushing, the printed circuit board stator winding is attached on the head drum so as to be located below the upper rotor yoke, the lower rotor yoke is attached on the bottom surface of the bushing so as to be positioned below the printed circuit board stator winding, and the permanent magnet is disposed at an inside of the lower rotor yoke facing toward the printed circuit board stator winding.

2. The head drum assembly of claim 1, wherein the print motor assembly further includes another permanent magnet provided on a bottom surface of the upper rotor yoke facing toward the printed circuit board stator winding.

3. A head drum assembly for use in a magnetic recording/reproducing apparatus, comprising:

a rotary shaft;

a head drum secured to the rotary shaft via a bearing;

a bushing fitted around the rotary shaft, for preloading the bearing, the bushing having a top and a bottom surfaces;

a deck at which the head drum assembly is engaged; and a print motor assembly including an upper rotor yoke, a printed circuit board stator winding, a lower rotor yoke, and a permanent magnet, wherein the upper rotor yoke is mounted on the top surface of the bushing, the printed circuit board stator winding is attached on the deck so as to be located below the upper rotor yoke, the lower rotor yoke is attached on the bottom surface of the bushing so as to be positioned below the printed circuit board stator winding, and the permanent magnet is disposed at inside of the lower rotor yoke facing toward the printed circuit board stator winding.

4. The head drum assembly of claim 3, wherein the print motor assembly further includes another permanent magnet provided on a bottom surface of the upper rotor yoke facing toward the printed circuit board stator winding.

* * * * *